United States Patent
Fujita

(10) Patent No.: US 10,151,410 B2
(45) Date of Patent: Dec. 11, 2018

(54) EXTENDING/CONTRACTING FLEXIBLE PIPE AND METHOD FOR ASSEMBLING EXTENDING/CONTRACTING FLEXIBLE PIPE

(71) Applicant: WATERWORKS TECHNOLOGY DEVELOPMENT ORGANIZATION CO., LTD., Osaka-shi, Osaka (JP)

(72) Inventor: Yasushi Fujita, Osaka (JP)

(73) Assignee: Waterworks Technology Development Organization Co., Ltd., Osaka (JP)

( * ) Notice: Subject to any disclaimer, the term of this patent is extended or adjusted under 35 U.S.C. 154(b) by 281 days.

(21) Appl. No.: 14/909,879

(22) PCT Filed: May 30, 2014

(86) PCT No.: PCT/JP2014/064403
§ 371 (c)(1),
(2) Date: Feb. 3, 2016

(87) PCT Pub. No.: WO2015/019691
PCT Pub. Date: Feb. 12, 2015

(65) Prior Publication Data
US 2016/0178100 A1 Jun. 23, 2016

(30) Foreign Application Priority Data
Aug. 8, 2013 (JP) .................................. 2013-164770

(51) Int. Cl.
*F16L 27/12* (2006.01)
*F16L 27/02* (2006.01)

(52) U.S. Cl.
CPC ............. *F16L 27/12* (2013.01); *F16L 27/026* (2013.01)

(58) Field of Classification Search
CPC .......... F16L 27/026; F16L 27/12; F16B 43/02
See application file for complete search history.

(56) References Cited

U.S. PATENT DOCUMENTS

| 4,482,171 A * | 11/1984 | Campbell | ............... F16L 17/00 |
| | | | 285/370 |
| 5,181,689 A * | 1/1993 | Makishima | ........... F16L 27/026 |
| | | | 137/614.04 |

(Continued)

FOREIGN PATENT DOCUMENTS

| CN | 1266157 A | 9/2000 |
| CN | 1291692 A | 4/2001 |

(Continued)

OTHER PUBLICATIONS

First Office Action from the State Intellectual Property Office of People's Republic of China, received in Chinese application No. 201480044440.5, dated Nov. 28, 2016.

(Continued)

*Primary Examiner* — James M Hewitt, II
(74) *Attorney, Agent, or Firm* — Procopio Cory Hargreaves and Savitch LLP

(57) ABSTRACT

Extending/contracting flexible pipe that has weather resistance, a structure in which a tie rod can properly exhibit its function, and easy assembly. The pipe including: a pair of joint sections (1) configured to be oscillatable and extendable/contractile with respect to each other; an attachment section (10) formed at the outer periphery of each of the pair of joint sections; a tie rod (5) inserted into rod holes (11) formed at the attachment sections and bridged across both of the attachment sections; and a washer (6) and nut (7) for fixing the tie rod to the attachment sections. An annular spacer (8) made of an elastic member is fixed to the tie rod. The washer is located at a position at which the rod hole is closed in the state in which the spacer is disposed inside of the rod hole, so that the washer shields the spacer from the outside.

6 Claims, 4 Drawing Sheets

(56) References Cited

U.S. PATENT DOCUMENTS

| | | |
|---|---|---|
| 6,250,690 B1 | 6/2001 | Sakai |
| 6,257,625 B1 | 7/2001 | Kitani et al. |
| 2016/0178100 A1 | 6/2016 | Fujita |

FOREIGN PATENT DOCUMENTS

| | | |
|---|---|---|
| JP | 59-013785 A | 1/1984 |
| JP | S60145240 A | 7/1985 |
| JP | 62-054388 U | 4/1987 |
| JP | 3027062 U | 5/1996 |
| JP | 3027062 U | 7/1996 |
| JP | H11-051270 A | 2/1999 |
| JP | 2000-161556 A | 6/2000 |
| JP | 2004150491 A | 5/2004 |
| JP | 2004-324769 A | 11/2004 |
| JP | 2004324769 A | 11/2004 |
| JP | 2013-127284 A | 6/2013 |
| JP | 2013127284 A | 6/2013 |
| JP | 2015034568 A | 2/2015 |
| WO | WO-2009121512 A1 * 10/2009 ............ F16L 27/026 |

OTHER PUBLICATIONS

Extended European Search Report received in related European patent application No. 14835438.4, dated Jun. 20, 2016, 8 pages.

Japanese Office Action received in Japanese patent application No. 2013-164770, dated Feb. 8, 2017, 3 pages.

International Search Report issued by the Japanese Patent Office for International Application No. PCT/JP2014/064403.

International Preliminary Report on Patentability (Chapter I) received in corresponding International application No. PCT/JP2014/064403, dated Feb. 18, 2016, 8 pages.

Office Action issued in co-pending Japanese Application No. 2017-463055 dated Jul. 19, 2018 in 5 pages.

\* cited by examiner

EXTENDING/CONTRACTING FLEXIBLE PIPE AND METHOD FOR ASSEMBLING EXTENDING/CONTRACTING FLEXIBLE PIPE

TECHNICAL FIELD

The present invention relates to an extending/contracting flexible pipe to be connected to a fluid pipe such as a water pipe and an assembling method therefor.

BACKGROUND ART

There has been known an extending/contracting flexible pipe having a pair of joint sections to be connected to a fluid pipe such as a water pipe, the joint sections being configured to be oscillatable and extendable/contractible with respect to each other. In order to prevent the flexible pipe from extending/contracting during transportation or during and after installing piping (embedding), a tie rod is securely bridged across attachment sections formed at the joint sections (see, for example, Patent Document 1).

The tie rod is a bolt having screw grooves at both ends thereof. The attachment sections have rod holes, into which the tie rod is inserted. A pairs of washers and nuts disposed in such a manner as to hold the attachment sections therebetween are tightened, thereby fixing the tie rod to the attachment sections.

PRIOR ART DOCUMENTS

Patent Documents

Patent Document 1: JP-A-2004-324769

SUMMARY OF THE INVENTION

Problems to be Solved by the Invention

In an extending/contracting flexible pipe, the wire diameter (or the screw diameter) of a tie rod to be attached depends upon a pressure resistance value. In order to cope with tie rods having various diameters, the size of a rod hole to be formed at an attachment section of the extending/contracting flexible pipe is set to be slightly great. Therefore, in attaching a tie rod, the tie rod having an outer diameter smaller than the inner diameter of the rod hole is attached in most cases, so that the axis of the tie rod is liable to be shifted from the center of the rod hole. With the axial misalignment between the tie rod and the rod hole, force locally acts on a washer when a load is applied, and consequently, the tie rod may not properly exhibit its function. In view of this, the axes of the tie rod and the rod hole should be preferably aligned with each other as much as possible.

Moreover, an extending/contracting flexible pipe requires weather resistance because it may be embedded in the ground while a tie rod is attached in most cases.

The present invention pays attention to the above-described problems to be solved. Therefore, an object of the present invention is to provide an extending/contracting flexible pipe that certainly has not only weather resistance but also a structure in which a tie rod can properly exhibit its function and assembly is easy, and a method for assembling the extending/contracting flexible pipe.

Means for Solving the Problems

The present invention employs the following means for achieving the object.

In other words, according to the present invention, there is provided an extending/contracting flexible pipe including: a pair of joint sections configured to be oscillatable and extendable/contractile with respect to each other; an attachment section formed at the outer periphery of each of the pair of joint sections; a tie rod that is inserted into rod holes formed at the attachment sections and is bridged across both of the attachment sections; and a washer and a nut for fixing the tie rod to the attachment sections, wherein an annular spacer made of an elastic member is fixed to the tie rod; and the washer is located at a position at which the rod hole is closed in the state in which the spacer is disposed inside of the rod hole, so that the washer shields the spacer from the outside.

As mentioned above, since the annular spacer fitted to the tie rod is disposed in the rod hole, the axis of the rod hole can readily accord with the axis of the tie rod. When the rod hole and the tie rod are coaxial with each other, force uniformly acts on the washer with the application of a load, thus enabling the tie rod for restraining the movement of the joint section to properly exhibit its function.

The diameter of the tie rod is varied according to a pressure resistance design value. However, the tie rods having various diameters can be used only by changing the diameter of the spacer. Thus, the commonality of a component part reduces a fabrication cost.

In spite of this, the washer is located at the position at which the rod hole is closed, and further, the washer shields the spacer from the outside. Therefore, the spacer is hardly affected by earth or the like even after the pipe is embedded, thereby suppressing the degradation of the spacer.

In addition, since the spacer is made of the elastic member and fitted to the spacer, the spacer can hold the washer even if the rod is inclined in fixing the rod to the attachment section, thus enhancing the assembling efficiency.

As a particularly preferred application example, the spacer is made of rubber.

In order to enhance durability, it is preferable that the axial length of the spacer is half or less of the axial length of the rod hole.

In order to effectively exhibit the tie rods of the function, it is preferable that further including: a ball section that is oscillatably held in the joint section on a predetermined center; and a connecting pipe that is held in the ball section in an extendable/contractile manner, wherein the attachment section is disposed inside of the predetermined center in a pipe axial direction, and a contact face between the nut and the washer disposed outside of the attachment section is located at the same position as the predetermined center in the pipe axial direction.

According to the present invention, there is provided an assembling method for bridging a tie rod across attachment sections in an extending/contracting flexible pipe including a pair of joint sections configured to be oscillatable and extendable/contractile with respect to each other and the attachment sections formed at the outer periphery of the pair of joint sections, the method including the steps of: fixing an annular spacer made of an elastic member to the tie rod; inserting the tie rod into a rod hole formed at the attachment section together with the spacer; and locating a washer at a position at which the rod hole is closed, and further, fixing the tie rod to the attachment section via a nut disposed outside of the washer, thus shielding the spacer from the outside.

With the implementation of this method, since the annular spacer fitted to the tie rod is disposed in the rod hole, the axis of the rod hole can readily accord with the axis of the tie rod.

When the rod hole and the tie rod are coaxial with each other, force uniformly acts on the washer with the application of a load, thus enabling the tie rod for restraining the movement of the joint section to properly exhibit its function.

The diameter of the tie rod is varied according to a pressure resistance design value. However, the tie rods having various diameters can be used only by changing the hole diameter of the spacer. Thus, the commonality of a component part reduces a fabrication cost.

In spite of this, the washer is located at the position at which the rod hole is closed, and further, the washer shields the spacer from the outside. Therefore, the spacer is hardly affected by earth or the like even after the pipe is embedded, thereby suppressing the degradation of the spacer.

Further, it is preferable that the tie rod is inclined or erected, to be thus inserted into the rod hole in the state in which the washer and the spacer disposed inside of the attachment section are fitted to the tie rod.

With the implementation of this method, since the spacer functions as the holder for holding the washer, the spacer can hold the washer even if the rod is inclined, thereby enhancing the assembling efficiency.

MODE FOR CARRYING OUT THE INVENTION

A description will be given below of a preferred embodiment according to the present invention with reference to the attached drawings.

Figure 1A:
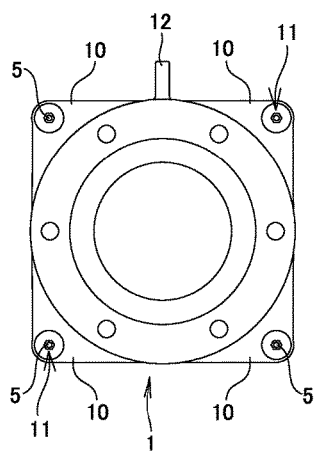
FIG. 1A is a front view showing an extending/contracting flexible pipe.
Figure 1B:
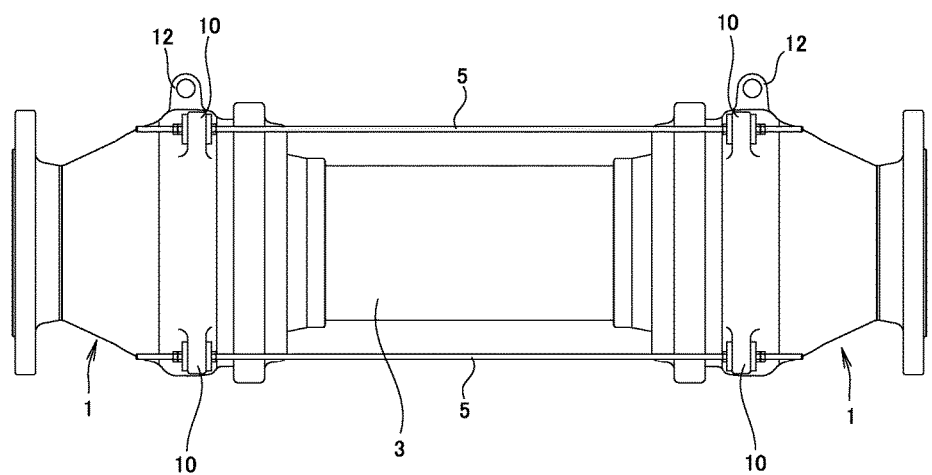
FIG. 1B is a side view showing the extending/contracting flexible pipe.

FIG. 1A is a front view showing an extending/contracting flexible pipe, as viewed in a pipe axial direction; FIG. 1B is a side view showing the extending/contracting flexible pipe; and FIG. 2 is a partly broken view showing the inside structure of the extending/contracting flexible pipe.

Figure 2:
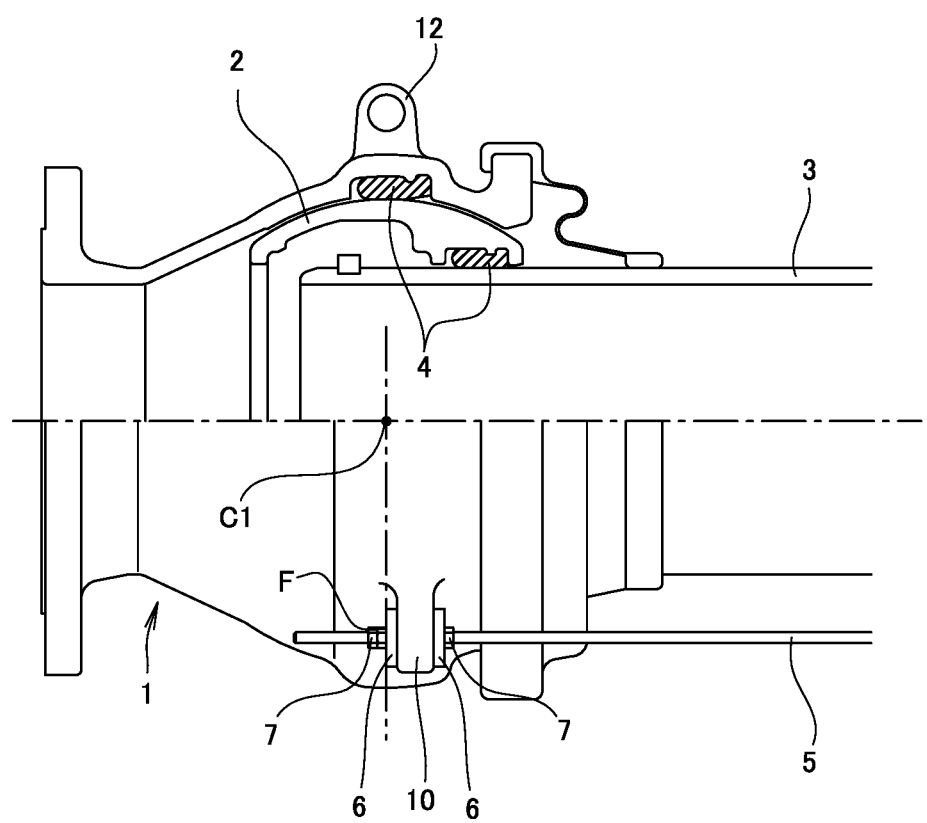
FIG. 2 is a partly broken view showing the inside structure of the extending/contracting flexible pipe.

As shown in FIGS. 1A, 1B, and 2, an extending/contracting flexible pipe includes: a pair of joint sections 1 to be connected to a fluid pipe such as a water pipe; a ball section 2 that is oscillatably held at the joint section around a predetermined center C1 and a connecting pipe 3 that is held at the ball section 2 in an extendable/contractile manner. The connecting pipe 3 is extendable/contractile with respect to the ball section 2 and the ball section 2 is oscillatable with respect to the joint section 1, and consequently, the pair of joint sections 1 is configured to be oscillatable and extendable/contractile with respect to each other. Since seal sections 4 are disposed at the joint section 1, the ball section 2, and the connecting pipe 3, they can be connected to each other in a water-tight manner.

Figure 4A:
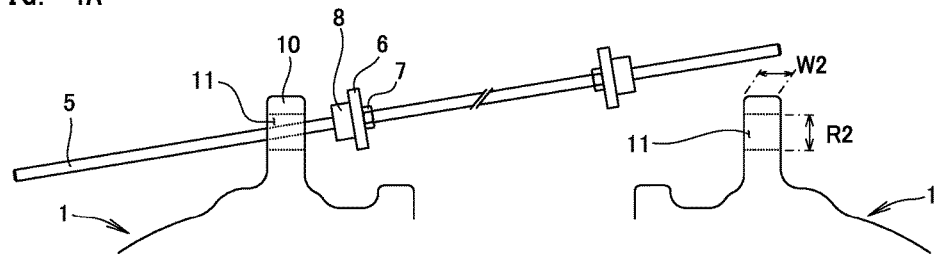
FIG. 4A is a view showing an assembling process in which the tie rod is attached.
Figure 4B:
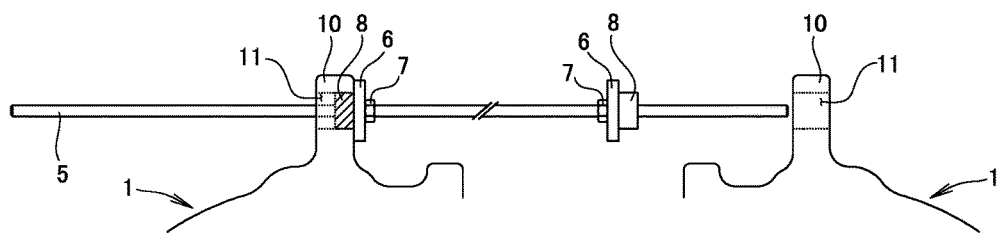
FIG. 4B is another view showing the assembling process in which the tie rod is attached.
Figure 4C:
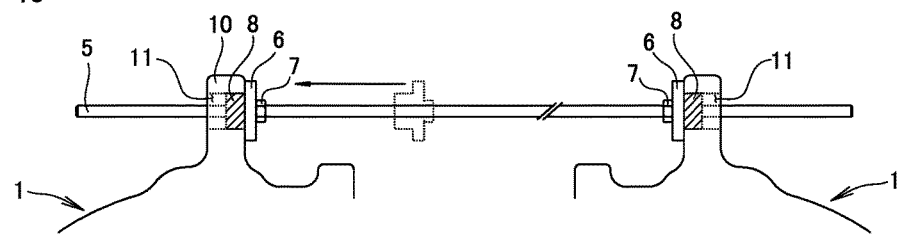
FIG. 4C is a further view showing the assembling process in which the tie rod is attached.
Figure 4D:
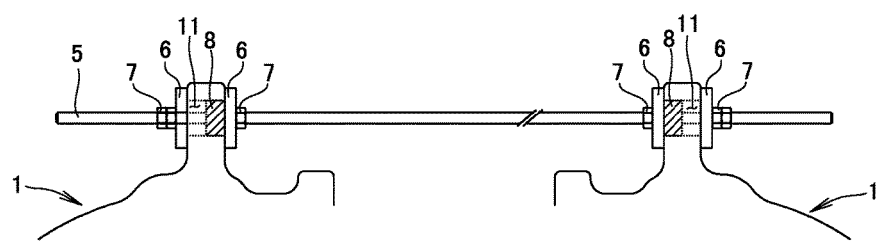
FIG. 4D is a still further view showing the assembling process in which the tie rod is attached.

Attachment sections 10 for attaching tie rods 5 are formed at the outer periphery of the pair of joint sections 1. FIGS. 4A to 4D are views showing a process in which the tie rods 5 are attached to the attachment sections 10. As shown in FIG. 4A, the attachment section 10 has a rod hole 11, into which the tie rod 5 is inserted. As shown in FIG. 1A, the plurality of attachment sections 10 and the plurality of rod holes 11 are arranged in the circumferential direction of the extending/contracting flexible pipe. Although four attachment sections 10 and four rod holes 11 are formed in the example shown in FIG. 1A, their numbers can be arbitrarily changed. A compound screw bolt or a full screw bolt is used as the tie rod 5, and further, screw grooves are formed at both ends of the bolt. As shown in FIGS. 1 and 4D, the tie rod 5 is inserted into the rod hole 11, and then, is bridged across the two attachment sections 10. As shown in FIGS. 2 and 4D, washers 6 and nuts 7 for fixing the tie rod 5 to the attachment section 10 are disposed on both sides of the attachment section 10. The attachment section 10 is located inward of the rotational center C1 of the ball section 2 in a pipe axial direction. Incidentally, a suspension hook 12 for use in transporting the extending/contracting flexible pipe is formed at the outer periphery of the joint section 1 in addition to the attachment section 10.

Figure 3:
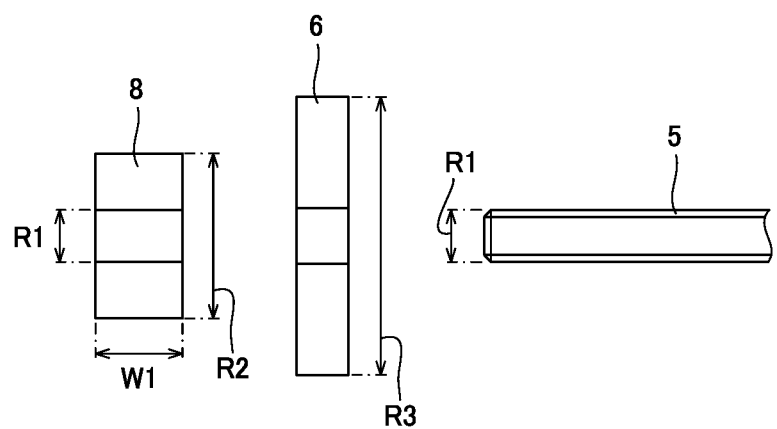
FIG. 3 is a view showing the sizes of a spacer, a washer, and a tie rod.
Figure 5:
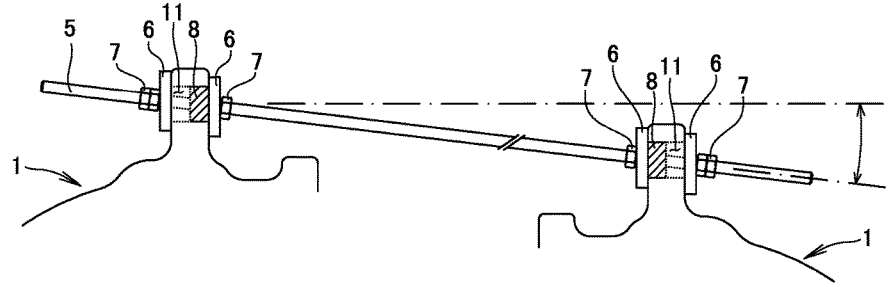
FIG. 5 is a view showing the tie rod when the extending/contracting flexible pipe is bent.

As shown in FIGS. 4A to 4D, the size of the rod hole 11 is set to be slightly great in order to cope with tie rods 5 having various diameters. In order to allow the axis of the rod hole 11 and the axis of the tie rod 5 to accord with each other without any cumbersome work, an annular spacer 8 made of an elastic member is attached to the tie rod 5. Although the spacer 8 is made of rubber in the present embodiment, it is not limited to this. The spacer 8 may be made of, for example, a resin or silicon. As shown in FIGS. 3 and 4A, the inner diameter R1 of the spacer 8 is equal to the outer diameter R1 of the tie rod 5. Moreover, the outer diameter R2 of the spacer 8 is equal to the inner diameter R2 of the rod hole 11. As a consequence, the axis of the tie rod 5 and the center of the rod hole 11 can accord with each other only by inserting the spacer 8 attached to the tie rod 5 into the rod hole 11. The axial length W1 of the spacer 8 is simply required to be smaller than the axial length W2 of the rod hole 11. It is preferable that the axial length W1 of the spacer 8 should be half or less of the axial length W2 of the rod hole 11. This is because a space is produced inside of the rod hole 11, so that local bending or shearing force hardly acts on the tie rod 5 even if the extending/contracting flexible pipe is bent, as shown in FIG. 5, thus enhancing durability.

As shown in FIG. 3, the washer 6 has an outer diameter R3 greater than that of the rod hole 11. As shown in FIG. 4D, the washer 6 is attached at a position at which the rod hole 11 is closed in the state in which the spacer 8 is contained inside of the rod hole 11. The washer 6 needs to completely close the rod hole 11. The washer 6 shields the spacer 8 from the outside. Here, the tie rod 5, the washer 6, and the nut 7 are made of SUS (Steel Use Stainless).

As shown in FIG. 2, in the state in which the tie rod 5 is fixed to the attachment section 10, a contact face F between the nut 7 and the washer 6 disposed outside of the attachment section 10 is located at the same position as the rotational center C1 of the ball section 2 in the pipe axial direction. Since the plurality of attachment sections 10 are arranged in the joint section 1 in the circumferential direction, the respective contact faces F are aligned in the pipe axial direction. With this assemblage, during bending when the ball section 2 is to be rotated, force is uniformly applied to the tie rods 5. This is preferable in view of strength and durability.

The extending/contracting flexible pipe having the above-described configuration is assembled in the following manner. First, as shown in FIG. 4A, the washer 6 and the nut 7 to be disposed inside of each of the attachment sections 10 are fitted to the tie rod 5. The spacer 8 is attached to the outside of the washer 6. Next, in the state in which the washer 6 and the spacer 8 are fitted to the tie rod 5, the tie rod 5 is inclined or erected, to be then inserted into the rod hole 11. At this time, the washer 6 would fall down by the gravity without the spacer 8. However, since the inner diameter R1 of the spacer 8 is equal to the outer diameter R1 of the tie rod 5 (see FIG. 3), the spacer 8 functions as a temporary holder for frictionally holding the washer 6. Subsequently, as shown in FIG. 4B, the tie rod 5 is inserted into the rod holes 11 of the attachment sections 10 together with the spacer 8. The tie rod 5 is first inserted into one of the rod holes 11, and then, the tie rod 5 is inserted into the other rod hole 11, as shown in FIG. 4C. Thereafter, as shown in FIG. 4D, the washer 6 is located at a position at which the rod hole 11 is closed. Subsequently, the tie rod 5 is fixed to the attachment section 10 via the nut 7 disposed outside of the washer 6, and then, the spacer 8 is shielded from the outside.

As described above, in the present embodiment, an extending/contracting flexible pipe including: a pair of joint sections 1 configured to be oscillatable and extendable/contractile with respect to each other; an attachment section 10 formed at the outer periphery of each of the pair of joint sections 1; a tie rod 5 that is inserted into rod holes 11 formed at the attachment sections 10 and is bridged across both of the attachment sections 10; and a washer 6 and a nut 7 for fixing the tie rod 5 to the attachment sections 10, wherein an annular spacer 8 made of an elastic member is fixed to the tie rod 5; and the washer 6 is located at a position at which the rod hole 11 is closed in the state in which the spacer 8 is disposed inside of the rod hole 11, so that the washer 6 shields the spacer 8 from the outside.

Since the annular spacer 8 fitted to the tie rod 5 is disposed in the rod hole 11, the axis of the rod hole 11 can readily accord with the axis of the tie rod 5. When the rod hole 11 and the tie rod 5 are coaxial with each other, force uniformly acts on the washer 6 with the application of a load, thus enabling the tie rod 5 for restraining the movement of the joint section 1 to properly exhibit its function.

The diameter of the tie rod 5 is varied according to a pressure resistance design value. However, the tie rods 5 having various diameters can be used only by changing the diameter of the spacer 8. Thus, the commonality of a component part reduces a fabrication cost.

In spite of this, the washer 6 is located at the position at which the rod hole 11 is closed, and further, the washer 6 shields the spacer 8 from the outside. Therefore, the spacer 8 is hardly affected by earth or the like even after the pipe is embedded, thereby suppressing the degradation of the spacer 8.

In addition, since the spacer 8 is made of the elastic member and fitted to the spacer 8, the spacer 8 can hold the washer 6 even if the rod 5 is inclined in fixing the rod 5 to the attachment section 10, thus enhancing the assembling efficiency.

In the present embodiment, the spacer 8 is made of rubber. Since rubber is readily fabricated, the fabrication cost can be reduced. Although rubber is liable to be degraded by the influence of earth or the like in embedding the pipe, the spacer 8 made of rubber is shielded from the outside, and therefore, the present invention is preferable in view of the suppression of degradation.

In the present embodiment, the axial length W1 of the spacer 8 is half or less of the axial length W2 of the rod hole 11. With this configuration, since there is a space inside of the rod hole 11, a local bending or shearing force hardly acts on the tie rod 5 even if the extending/contracting flexible pipe is bent, thus enhancing durability.

In the present embodiment, the extending/contracting flexible pipe further including: a ball section 2 that is oscillatably held in the joint section 1 on a predetermined center C1; and a connecting pipe 3 that is held in the ball section 2 in an extendable/contractile manner, wherein the attachment section 10 is disposed inside of the predetermined center C1 in a pipe axial direction, and a contact face F between the nut 7 and the washer 6 disposed outside of the attachment section 10 is located at the same position as the predetermined center C1 in the pipe axial direction.

With this configuration, force uniformly exerts on the tie rods 5 in the case where the extending/contracting flexible pipe is to be bent. Therefore, the external force is dispersed to the tie rods 5, and thus, the tie rods 5 can effectively exhibit their function. Moreover, after bending, even if force further acts in a drawing direction, the force can be dispersed to the tie rods 5, and thus, the tie rods 5 can effectively exhibit their function.

In the present embodiment, an assembling method for bridging a tie rod 5 across attachment sections 10 in an extending/contracting flexible pipe including a pair of joint sections 1 configured to be oscillatable and extendable/contractile with respect to each other and the attachment sections 10 formed at the outer periphery of the pair of joint sections 1, the method including the steps of: fixing an annular spacer 8 made of an elastic member to the tie rod 5; inserting the tie rod 5 into a rod hole 11 formed at the attachment section 10 together with the spacer 8; and locating a washer 6 at a position at which the rod hole 11 is closed, and further, fixing the tie rod 5 to the attachment section 10 via a nut 7 disposed outside of the washer 6, thus shielding the spacer 8 from the outside.

With the implementation of this method, since the annular spacer 8 fitted to the tie rod 5 is disposed in the rod hole 11, the axis of the rod hole 11 can readily accord with the axis of the tie rod 5. When the rod hole 11 and the tie rod 5 are coaxial with each other, force uniformly acts on the washer 6 with the application of a load, thus enabling the tie rod 5 for restraining the movement of the joint section 1 to properly exhibit its function.

The diameter of the tie rod 5 is varied according to a pressure resistance design value. However, the tie rods 5 having various diameters can be used only by changing the hole diameter of the spacer 8. Thus, the commonality of a component part reduces a fabrication cost.

In spite of this, the washer 6 is located at the position at which the rod hole 11 is closed, and further, the washer 6 shields the spacer 8 from the outside. Therefore, the spacer 8 is hardly affected by earth or the like even after the pipe is embedded, thereby suppressing the degradation of the spacer 8.

In the present embodiment, the tie rod 5 is inclined or erected, to be thus inserted into the rod hole 11 in the state in which the washer 6 and the spacer 8 disposed inside of the attachment section 10 are fitted to the tie rod 5. In this manner, since the spacer 8 functions as the holder for holding the washer 6, the spacer 8 can hold the washer 6 even if the rod 5 is inclined, thereby enhancing the assembling efficiency.

The present invention is not limited to the above-described embodiment, and it can be variously modified or altered within the scope without departing from the subject of the present invention.

According to the present invention, the pipe is not limited to a water pipe, but the present invention is applicable to pipes, through which various kinds of liquid or air flow. Furthermore, the structures adopted in each of the embodiments may be adopted in any other embodiments.

DESCRIPTION OF REFERENCE SIGNS

1 joint section
10 attachment section
11 rod hole
2 ball section
3 connecting pipe
5 tie rod
6 washer
7 nut
8 spacer

The invention claimed is:

1. An extending/contracting flexible pipe comprising:
    a pair of joint sections configured to be oscillatable and extendable/contractile with respect to each other;
    an attachment section formed at the outer periphery of each of the pair of joint sections;
    a tie rod that is inserted into rod holes formed at the attachment sections and is bridged across both of the attachment sections; and
    a washer and a nut for fixing the tie rod to the attachment sections,
    wherein an annular spacer made of an elastic member is attached to the tie rod, and wherein the spacer has an axial length that is half or less than an axial length of each rod hole; and
    the washer is located at a position at which the rod hole is closed in the state in which the spacer is disposed inside of the rod hole, so that the washer shields the spacer from the outside.

2. The extending/contracting flexible pipe according to claim 1, wherein the spacer is made of rubber.

3. The extending/contracting flexible pipe according to claim 1, further comprising:
    a ball section that is oscillatably held in the joint section on a predetermined center; and
    a connecting pipe that is held in the ball section in an extendable/contractile manner,
    wherein the attachment section is disposed inside of the predetermined center in a pipe axial direction.

4. The extending/contracting flexible pipe according to claim 3,
    wherein
    a contact face between the nut and the washer disposed outside of the attachment section is located at the same position as the predetermined center in the pipe axial direction.

5. An assembling method for bridging a tie rod across attachment sections in an extending/contracting flexible pipe including a pair of joint sections configured to be oscillatable and extendable/contractile with respect to each other and the attachment sections formed at the outer periphery of the pair of joint sections, the method comprising the steps of:
    attaching an annular spacer made of an elastic member to the tie rod;
    inserting the tie rod into a rod hole formed at the attachment section together with the spacer, wherein the spacer has an axial length that is half or less than an axial length of the rod hole; and
    locating a washer at a position at which the rod hole is closed, and further, fixing the tie rod to the attachment section via a nut disposed outside of the washer, thus shielding the spacer from the outside.

6. The assembling method for an extending/contracting flexible pipe according to claim 5, wherein the tie rod is inclined or erected, to be thus inserted into the rod hole in the state in which the washer and the spacer disposed inside of the attachment section are fitted to the tie rod.

\* \* \* \* \*